US012570293B2

(12) United States Patent
Brown et al.

(10) Patent No.: US 12,570,293 B2
(45) Date of Patent: Mar. 10, 2026

(54) METHOD AND DEVICE FOR MULTI-SENSOR DATA FUSION FOR AUTOMATED AND AUTONOMOUS VEHICLES

(71) Applicant: Bayerische Motoren Werke Aktiengesellschaft, Munich (DE)

(72) Inventors: Sean Brown, Munich (DE); Frank Keidel, Poing (DE); Sebastian Rauch, Eisenhofen (DE); Alexander Born, Munich (DE); Axel Jansen, Unterschleißheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 471 days.

(21) Appl. No.: 17/439,805

(22) PCT Filed: Feb. 19, 2020

(86) PCT No.: PCT/EP2020/054290
§ 371 (c)(1),
(2) Date: Sep. 16, 2021

(87) PCT Pub. No.: WO2020/229002
PCT Pub. Date: Nov. 19, 2020

(65) Prior Publication Data
US 2022/0169280 A1 Jun. 2, 2022

(30) Foreign Application Priority Data
May 13, 2019 (DE) ..................... 10 2019 112 413.1

(51) Int. Cl.
*B60W 40/072* (2012.01)
*B60W 60/00* (2020.01)
(Continued)

(52) U.S. Cl.
CPC ........ *B60W 40/072* (2013.01); *B60W 60/001* (2020.02); *G01C 21/3822* (2020.08);
(Continued)

(58) Field of Classification Search
CPC ............. B60W 40/072; B60W 60/001; B60W 2552/20; B60W 2554/4041;
(Continued)

(56) References Cited

U.S. PATENT DOCUMENTS

| | | | | |
|---|---|---|---|---|
| 5,615,116 A | * | 3/1997 | Gudat | .................... B60K 31/04 318/587 |
| 6,718,259 B1 | * | 4/2004 | Khosla | ................... G01C 21/26 701/96 |

(Continued)

FOREIGN PATENT DOCUMENTS

| | | |
|---|---|---|
| CN | 101793528 A | 8/2010 |
| CN | 103884342 A | 6/2014 |

(Continued)

OTHER PUBLICATIONS

M. Lundgren, E. Stenborg, L. Svensson and L. Hammarstrand, "Vehicle self-localization using off-the-shelf sensors and a detailed map," 2014 IEEE Intelligent Vehicles Symposium Proceedings, Dearborn, MI, USA, 2014, pp. 522-528, doi: 10.1109/IVS.2014. 6856524. (Year: 2014).*

(Continued)

*Primary Examiner* — Helal A Algahaim
*Assistant Examiner* — Merritt E Levy
(74) *Attorney, Agent, or Firm* — Maginot, Moore & Beck LLP

(57) ABSTRACT
A method estimates a course of a roadway in a vicinity of a vehicle based on a state function describing the course of the roadway, wherein the state function includes a clothoid spline. The method includes providing ambient measured (Continued)

☐ Vehicle
〰 Boundary line (visible)
--- Center line (lane center, not visible)

data describing the course of the roadway at a current position of the vehicle, where the ambient measured data includes a polynomial function. The method also includes transforming the state function and the ambient measured data into a common coordinate system, and checking the ambient measured data for an error. If no error is detected, then the state function is adapted based on the ambient measured data in the common coordinate system. If an error is detected, then the error is stored.

19 Claims, 5 Drawing Sheets

(51) Int. Cl.

| | |
|---|---|
| *G01C 21/00* | (2006.01) |
| *G06V 10/44* | (2022.01) |
| *G06V 10/80* | (2022.01) |
| *G06V 20/56* | (2022.01) |
| *G06V 20/58* | (2022.01) |

(52) U.S. Cl.
CPC ....... *G01C 21/387* (2020.08); *G01C 21/3889* (2020.08); *G06V 10/443* (2022.01); *G06V 10/803* (2022.01); *G06V 20/58* (2022.01); *G06V 20/588* (2022.01); *B60W 2552/20* (2020.02); *B60W 2554/4041* (2020.02)

(58) Field of Classification Search
CPC ......... B60W 2420/42; B60W 2552/30; B60W 2556/40; G01C 21/3822; G01C 21/387; G01C 21/3889; G06V 10/443; G06V 10/803; G06V 20/58; G06V 20/588; G06F 18/251
USPC .......................................................... 701/23
See application file for complete search history.

(56) References Cited

U.S. PATENT DOCUMENTS

| | | | | |
|---|---|---|---|---|
| 6,751,547 | B2 | 6/2004 | Khosla | |
| 8,949,016 | B1 * | 2/2015 | Ferguson | B60W 50/0097 |
| | | | | 340/436 |
| 11,520,345 | B2 * | 12/2022 | Onofrio | G05D 1/617 |
| 2005/0225477 | A1 * | 10/2005 | Cong | B60K 31/0083 |
| | | | | 342/72 |
| 2008/0183419 | A1 * | 7/2008 | Cong | G01S 13/723 |
| | | | | 702/155 |
| 2009/0144030 | A1 * | 6/2009 | Witmer | G01C 21/3867 |
| | | | | 703/2 |
| 2009/0144031 | A1 | 6/2009 | Witmer | |
| 2013/0173232 | A1 * | 7/2013 | Meis | G08G 1/167 |
| | | | | 703/2 |
| 2015/0149076 | A1 * | 5/2015 | Strauss | G01C 21/34 |
| | | | | 701/410 |
| 2016/0018229 | A1 * | 1/2016 | Lee | B60W 40/072 |
| | | | | 701/409 |
| 2016/0245657 | A1 * | 8/2016 | Dorum | G01C 21/3881 |
| 2016/0314360 | A1 * | 10/2016 | Kizumi | G06V 20/588 |
| 2017/0068862 | A1 * | 3/2017 | Mueter | H04N 7/181 |
| 2017/0202131 | A1 | 7/2017 | Bunderson et al. | |
| 2018/0012083 | A1 * | 1/2018 | Masui | G06V 20/588 |
| 2018/0037262 | A1 * | 2/2018 | Imai | G08G 1/168 |
| 2019/0266418 | A1 * | 8/2019 | Xu | G06V 10/457 |
| 2020/0064855 | A1 * | 2/2020 | Ji | G05D 1/0246 |

FOREIGN PATENT DOCUMENTS

| | | | | | |
|---|---|---|---|---|---|
| CN | 106164930 | A | | 11/2015 | |
| CN | 106842231 | A | | 6/2017 | |
| CN | 107646114 | A | | 1/2018 | |
| DE | 102013003944 | A1 | | 9/2014 | |
| DE | 102015013085 | A1 | | 3/2016 | |
| DE | 102017005921 | A1 | | 12/2017 | |
| DE | 102016214045 | A1 | | 2/2018 | |
| DE | 102016220581 | A1 * | | 4/2018 | |
| DE | 102017212254 | A1 | | 1/2019 | |
| EP | 2105708 | A2 * | | 9/2009 | B60W 10/06 |
| WO | WO-2016146823 | A1 * | | 9/2016 | B60W 40/072 |

OTHER PUBLICATIONS

K. Peterson, J. Ziglar and P. E. Rybski, "Fast feature detection and stochastic parameter estimation of road shape using multiple LIDAR," 2008 IEEE/RSJ International Conference on Intelligent Robots and Systems, Nice, France, 2008, pp. 612-619, doi: 10.1109/IROS.2008. 4651161. (Year: 2008).*

C. Guo, J. Meguro, Y. Kojima and T. Naito, "A Multimodal ADAS System for Unmarked Urban Scenarios Based on Road Context Understanding," in IEEE Transactions on Intelligent Transportation Systems, vol. 16, No. 4, pp. 1690-1704, Aug. 2015, doi: 10.1109/ TITS.2014.2368980. (Year: 2015).*

Yoshiteru Matsushita and J. Miura, "Simultaneous estimation of road region and ego-motion with multiple road models," 2008 IEEE International Conference on Multisensor Fusion and Integration for Intelligent Systems, Seoul, Korea (South), 2008, pp. 526-532, doi: 10.1109/MFI.2008.4648049. (Year: 2008).*

International Search Report corresponding to International Patent Application No. PCT/EO2020/054290, dated May 25, 2020 (4 pages).

German Search Report corresponding to German Patent Application No. 10 2019 112 413.1, dated Jul. 3, 2020 (10 pages).

Manolis Tsogas et al. "Using digital maps to enhance lane keeping support systems" Intelligent Vehichles Symposium, 2007 IEEE, IEEE, PI, Jun. 1, 2007 (Jun. 1, 2007) pp. 148-153.

Gackstatter C. et al. "Fusions of clothoid segments for a more accurate and updated prediction of the road geometry", Intelligent Trandsportation Systems (ITSC), 2010 13th Internstional IEEE Conference on, IEE, Piscataway, NK, USA, Sep. 19, 2010 (Sep. 19, 2010), Seiten 1691-1696, XP031792796.

Chinese Office Action corresponding to Chinese Patent Application No. 202080010137.9, dated May 30, 2023 (15 pages).

English Translation of Chinese Office Action corresponding to Chinese Patent Application No. 202080010137.9, dated May 30, 2023 (18 pages).

* cited by examiner

☐ Vehicle
〰 Boundary line (visible)
--- Center line (lane center, not visible)

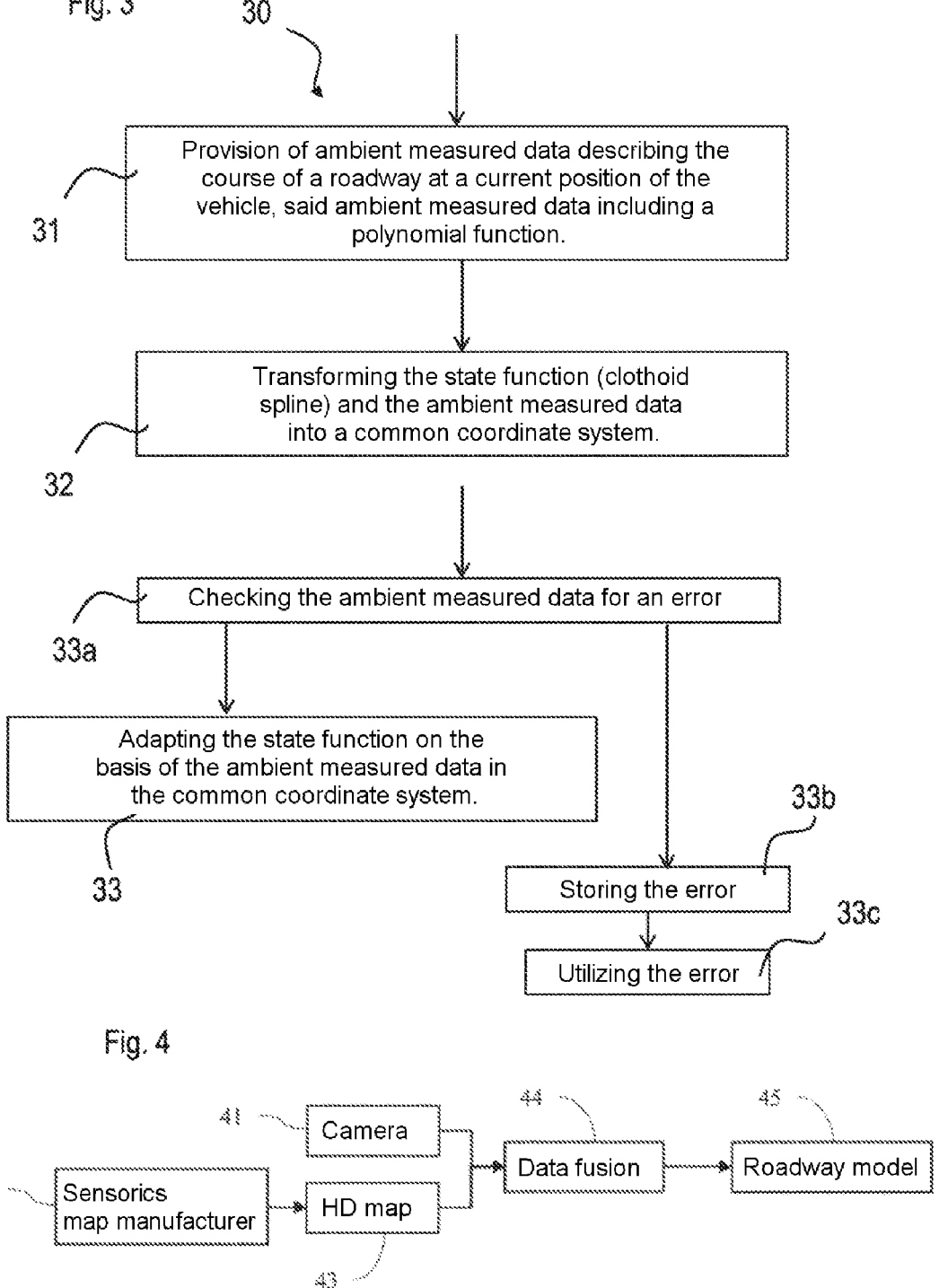

31 — Provision of ambient measured data describing the course of a roadway at a current position of the vehicle, said ambient measured data including a polynomial function.

32 — Transforming the state function (clothoid spline) and the ambient measured data into a common coordinate system.

33a — Checking the ambient measured data for an error

33 — Adapting the state function on the basis of the ambient measured data in the common coordinate system.

33b — Storing the error

33c — Utilizing the error

Fig. 4

41 — Camera
42 — Sensorics map manufacturer
43 — HD map
44 — Data fusion
45 — Roadway model 51 ------⊗  Sample points on clothoid spline
52 ----⊗  Sample points on camera polynomial

METHOD AND DEVICE FOR MULTI-SENSOR DATA FUSION FOR AUTOMATED AND AUTONOMOUS VEHICLES

The present application is the U.S. national phase of PCT Application PCT/EP2020/054290 filed on Feb. 19, 2020, which claims priority of German patent application No. 102019112413.1 filed on May 13, 2019, which is incorporated herein by reference in its entirety.

TECHNICAL FIELD

Embodiments of the present invention relate generally to a computer-implemented method, a vehicle, a computer program and a device for estimating a course of a roadway.

BACKGROUND

In a control system of some automated vehicles or vehicles driving autonomously, methods for estimating the course of a roadway come into operation, on the basis of which the control system of such a vehicle takes driving decisions.

The course of a roadway can be described approximately by determining a roadway model corresponding to the state function. As a result, the course of a roadway—in particular, relative to a position and/or an orientation of the vehicle—can be ascertained. Properties of the course of a roadway may be, for instance, width, direction, curvature or number of adjacent lanes or the position of the vehicle with respect to the lanes (for example, the vehicle is located in the right, the middle or the left of three lanes).

The vehicle can then be controlled in such a way that, for example, it follows the course of the roadway, avoids obstacles, or is able to change lanes. For a highly available, safe and convenient operation of the vehicle, ambient measured data pertaining to several data sources can be combined (merged) at the time of an ascertainment of the course or model of a roadway. "Combining data sources", also designated as data fusion, means, in this connection, combining data pertaining to several data sources. Typical data sources may be, for instance, sensory data sources such as a camera, or waypoints on a digital map. Such a digital map may be, in particular, a standard-definition (SD) map or a high-definition (HD) map. There are various possibilities for such a data fusion.

Document WO 2018/019454 describes a method for ascertaining a roadway model. In this method, a plurality of hypotheses for a roadway model are generated by means of varying parameterizations of map data and observation data. On the basis of confidence values of the hypotheses, one hypothesis for a roadway model is selected. A method for data fusion of the observation data and camera data that guarantees a highly available determination of the course of a roadway is not taken into consideration here.

Other conventional control systems typically use exclusively data pertaining to a single data source (camera, digital map), in order to create a roadway model. In this case, a highly available determination of the course of a roadway cannot be guaranteed, since a determination of the course of a roadway is no longer possible in the case where inoperability of the data source arises. Moreover, individual data sources can generate noisy or, in part, defective ambient measured data, as a result of which an estimate of the course of a roadway may be inaccurate. There is therefore a need to create a computer-implemented method for estimating the course of a roadway that guarantees a highly available and precise determination of the course of a roadway. The computer-implemented method, the device, the computer program and the vehicle as claimed in the independent claims take this need into account.

SUMMARY

Embodiments described herein create a computer-implemented method, a vehicle, a computer program and a device that serve for estimating a course of a roadway in a vicinity of the vehicle. By means of data fusion of ambient measured data pertaining to several data sources with a state function (roadway model) describing the course of a roadway, a high availability and a high precision of the estimating can be guaranteed.

The ambient measured data pertaining to the respective data sources are output variables of measurements of the course of a roadway and include at least one polynomial function. The state function encompasses a clothoid spline. The "data fusion" of the ambient data with the state function means, in this connection, the adapting of the state function—or, to be more exact, of the clothoid spline—to the ambient measured data by a real-time filter. A Kalman filter, for instance, has proved to be an advantageous real-time filter for the estimation of the course of a roadway.

The adapting of the state function with the Kalman filter usually requires the transforming of the state function from a state space into a measurement space. In embodiments described herein it may be a question of transforming the state function between various coordinate systems. In the measurement space a state function arising from a prediction carried out by the Kalman filter can be corrected with ambient measured data pertaining to several data sources or sensors. In connection with the Kalman filter, this is usually designated as innovation. The state function that has been updated by the adaptation or innovation corresponds to an approximate estimate of the course of a roadway. By virtue of temporally repeating adapting of the state function to ambient measured data, the estimate is updated continually, so that, for instance, a course of a roadway of a highway can be estimated precisely and safely. Adapting the state function to ambient measured data pertaining to several data sources guarantees a high availability and a high accuracy when estimating the course of a roadway. A first aspect relates to a computer-implemented method for estimating a course of a roadway in a vicinity of a vehicle on the basis of a state function describing the course of a roadway. The state function encompasses a clothoid spline.

Furthermore, the computer-implemented method includes a provision of ambient measured data that describe the course of a roadway in a defined vicinity of the current position of the vehicle. The ambient measured data include at least one polynomial function. The polynomial function can, for instance, be generated from a polyline with the aid of a curve-regression method. Such a polyline designates a series of contiguous line segments. The computer-implemented method includes, moreover, transforming the state function and the ambient measured data into a common coordinate system and adapting the state function on the basis of the ambient measured data in the common coordinate system.

For instance, the computer-implemented method is based on a recursive method—such as, for example, the Kalman filter—which may feature consecutive recursion steps. Each recursion step may serve for estimating the course of a roadway that is described by the state function. Since clothoids are frequently employed in traffic-route engineering when computing the course of a roadway, the course of a roadway can, in turn, be estimated precisely or reconstructed approximately by consecutive clothoid segments. It may therefore be advantageous to assume the clothoid spline for the state function when estimating the course of a roadway. The clothoid spline may have been completely determined by parameters such as curvature, change of curvature, angle and y-axis intercept.

Input variables for estimating the course of a roadway are the ambient measured data. The ambient measured data may be present in the form of polynomial functions or polynomial splines, which may result from measured data pertaining to sensors outside the vehicle and/or inside the vehicle. The ambient measured data map approximately, for instance, the observed course of a roadway in the vicinity of the vehicle.

The ambient measured data can then be compared with the state function. For this purpose it is advantageous that the state function and the ambient measured data are present in the common measurement space. Transforming the state function into another coordinate system is frequently suitable for this. For instance, the clothoid spline may have been represented in a coordinate system with curvature values and arc lengths, whereas the ambient measured data are present in a coordinate system with spatial coordinates. For this reason, a measurement model, for instance, is applied to the state function, in order to represent the state function at least approximately in the coordinate system with spatial coordinates. The clothoid spline, which is typically represented as a function of an arc length, can, for instance, be represented approximately by one or more third-degree polynomials or in a parameter representation in spatial coordinates. The state function acquired at the time of the prediction can then be updated with the ambient measured data in the Kalman filter.

By way of output variable of a recursion step, usually the updated state function is obtained. For a highly available and precise computer-implemented method for determining the course of a roadway, it may be advantageous to draw upon ambient data pertaining to several—where appropriate, diverse—data sources or sensors for the data fusion of the recursion step. Such a data fusion is designated as multi-sensor data fusion.

In each recursion step, a check may additionally take place as to whether there is an error in the underlying ambient data. There may be an error of such a type, for instance, if lane markings have been changed due to a construction site. In such a case, the ambient data pertaining to a map and to a camera differ. Furthermore, the quality of the lane markings may also be poor, or the camera may be carrying out an erroneous measurement.

The check can be undertaken by a deviation between a value of the state function ascertained in a prediction step of a Kalman filter and the current ambient data being ascertained and by this deviation being compared with a predetermined threshold value. If the ascertained deviation is greater than a predetermined (upper) threshold value or less than a predetermined (lower) threshold value, there is an error.

This error can subsequently be stored, and the current ambient data will not be used any further for the updating of the state function. The storing may also include a marking of a faulty lane marking corresponding to the error.

Furthermore, the error and corresponding data, such as the marked faulty lane marking, can subsequently be sent to a receiving unit arranged outside the vehicle. Depending upon the error, the transmitted data can easily be utilized, for instance for a highways authority for the purpose of correcting the faulty lane marking on a highway and/or to for a vehicle manufacturer for the purpose of improving a camera/lidar lane-marking recognition function, in particular for manual labeling for the purpose of improving learning algorithms. Furthermore, the transmitted data can be utilized to decide whether an autonomous driving mode is to be deactivated at this faulty lane marking. Consequently these data can be utilized to enhance the reliability and safety of autonomous driving functions. Furthermore, the sent data can be checked, in order to detect whether the error has arisen by reason of faulty data pertaining to a camera or by reason of faulty data pertaining to a digital map.

The sending can, for instance, be undertaken automatically after the detection of the error. Alternatively or additionally, the sending can be undertaken in bundled manner— for example, always at night or always after the vehicle has been parked, or something similar. Furthermore, sending to other vehicles may also be undertaken.

In some embodiments, the ambient measured data can be captured by at least one camera. For instance, a camera, as one of several sensors or several cameras, can be used for multi-sensor data fusion. Photographs of a roadway taken by the at least one camera can be drawn upon in order to detect the course of a roadway by means of a suitable image-processing application. For instance, a course of roadway markings or roadway boundaries can be ascertained from the photographs and can be represented approximately by at least one polynomial function. The at least one polynomial function corresponds to the ambient measured data. For a more accurate estimate, the course of a roadway can also be approximated by a plurality of connected polynomial functions.

A capture of the course of a roadway with the aid of a plurality of cameras can likewise contribute to a more accurate estimation of the course of a roadway.

Additionally or alternatively, ambient measured data can be provided from a map. The map is present, for instance, as a digital map with a certain spatial resolution. High-definition maps (HD maps), for instance, have a spatial resolution from 10 cm to 25 cm, which means that structures or objects can be represented, the measurement of which, at least in one dimension, corresponds to the respective spatial resolution with an accuracy of the spatial resolution. For instance, in this way the roadway, roadway boundaries or roadway markings can be detected. Waypoints that denote the course of a roadway can be taken from the map. By means of interpolation of the waypoints, a polynomial or, as usual, a polynomial spline of several polynomials that determine the course of a roadway approximately by reference to the waypoints on the map can be ascertained. The polynomial or the polynomial spline is designated as map data. In some practical forms, first ambient measured data can be captured by at least one camera, and second ambient measured data can be provided from a map. By reference to the ambient measured data captured by the camera or ascertained from the map, in each instance a polynomial or a polynomial spline can be ascertained that in each instance describes approximately the course of a roadway in the vicinity of the vehicle. The state function can be adapted to the first ambient measured data and additionally to the second ambient measured data. By adapting of the state function to ambient measured data pertaining to several different types of sensor or data sources (camera and map), a high availability and an increased precision of the determination of the course of a roadway can result. "High availability" means, in this connection, that, even in the event of failure of a data source, the course of a roadway can continue to be estimated reliably, so that in this case the vehicle can still be steered into a safe parking position or into a workshop, for instance.

In further embodiments, the computer-implemented method may feature the transforming of the state function and of the ambient data into a common coordinate system with spatial coordinates. The innovation carried out by the Kalman filter typically requires transforming the state function into the measurement space, in order to update the state function with the ambient measured data. Typically, the ambient measured data pertaining to the camera are already present in a coordinate system with spatial coordinates. Hence the "transforming" of the state function means a conversion with the aid of a measurement model, so that the state function can be represented in the measurement space, the coordinate system with spatial coordinates. In this connection, the clothoid spline is described, for instance, by one or more third-degree polynomials or, in the parameter representation, by Fresnel integrals. For a reduction of the numerical complexity at the time of the data fusion, the Fresnel integrals can each be approximated by a Taylor series. An advantageous aspect of the data fusion in the coordinate system with spatial coordinates is that an orientation and absolute position of the vehicle on the roadway can be determined. For instance, in this way it can be determined in which lane of a multi-lane roadway the vehicle is located and/or whether it is moving along the roadway or at a right angle to the roadway.

Further embodiments include, moreover, a sampling method for determining sample points for the adapting of the state function. When there are several sample points in each instance, it may be advantageous if there is a constant curve length between adjacent sample points. The sample points can be ascertained, for instance, by a suitable mathematical method. The constant curve length can serve as input variable for the mathematical method and may, for instance, have been predetermined or may be ascertained as a function of a property of the course of a roadway, such as a roadway curvature, for example.

For the adapting by the Kalman filter, it may be advantageous if the state function and/or the ambient measured data is/are present in a point space of the measurement space. This means that—for instance, to the advantage of the adapting—both the state function and the ambient measured data are each represented by a plurality of sample points. By reference to the sample points, the Kalman filter can adapt the state function to the ambient measured data. The sample points are typically present in a coordinate system with spatial coordinates.

Optionally, the sample points can be determined exclusively for the state function. The sample points are then interpolated, for instance by a polynomial of the same order as the polynomial of the ambient measured data. The Kalman filter may then have been designed in such a way that, in each recursion step, polynomial parameters of the transformed state function are approximated to further polynomial parameters of the ambient measured data. Via a measurement model, parameters of the state function can be ascertained from the polynomial parameters, so that the state function with the parameters corresponds approximately to the ambient measured data.

In the case of a plurality of sample points of the state function and of the ambient measured data, the sample points can be chosen in a manner depending on a sampling method in such a way that it is advantageous for the adapting of the state function to the ambient measured data. In this connection, sample points to be compared are chosen in such a way that they lie on a similar arc length of the state function or of the ambient measured data. Moreover, in the case of a plurality of sample points in each instance, these can be chosen in such a way that, in each instance, there is a constant arc length of the curve between adjacent sample points of a curve (state function, ambient measured data).

Hence a state function that exhibits intense curvatures can be precisely adapted to the ambient measured data pertaining to the camera. In this way, in some embodiments the reliable estimation of a possibly intensely curved course of a roadway can be guaranteed.

In further embodiments, the computer-implemented method may feature transforming the state function and the ambient data into a common coordinate system with curvature values. The measurement space in this case encompasses a two-dimensional coordinate system that has been determined by curvature values and arc lengths. Usually, the clothoid spline is present in this measurement space. The map data are typically present as a polynomial spline in a coordinate system with spatial coordinates, which may result from an interpolation of the waypoints. The polynomial spline can be transformed in such a way that the curvature values of the polynomial spline can be ascertained as a function of the arc length of the polynomial spline. Hence the state function and the polynomial spline can be represented in the measurement space that encompasses the coordinate system with the curvature values and the arc lengths. In this way, the curvature values of the state function are comparable for the Kalman filter with the curvature values of the polynomial spline.

In some versions, the adapting of the state function to the ambient measured data may make provision for adapting at least one curvature value of the state function to at least one further curvature value of the ambient measured data. At the time of the innovation carried out by the Kalman filter, the curvature values of the state function and of the polynomial spline may, for instance, be drawn upon as input variables. The "data fusion" of the map data with the Kalman filter means, in this connection, the adapting of the curvature values of one point or of several points of the state function to the curvature values of a transform of the map data.

The computer-implemented method described herein may, in particular, have been designed to determine the course of a roadway of ordinary highways or roadways. Ordinarily, the roadways—above all, on freeways, on freeway-like highways and in an urban zone—have been provided with roadway markings in order to make the course of a roadway evident for a vehicle driver, for instance. The roadway markings can be drawn upon, for instance, for the purpose of estimating the course of a roadway.

According to further embodiments, the state function may characterize a course of the roadway marking of the roadway. For this purpose, photographs of the roadway markings can be taken by the at least one camera. A capture of the course of a roadway by means of the at least one camera is usually undertaken via an image-processing application that is able to ascertain a course of roadway markings or roadway boundaries from photographs taken by the at least one camera. Hence ambient measured data pertaining to the at least one camera may characterize the course of the roadway markings or of the roadway boundaries. This estimate can be advantageous in connection with the control of the vehicle, for instance in order to ascertain a roadway width or a distance of the vehicle from the roadway boundary.

In further embodiments, ascertaining a course of a lane center by transforming the state function may be advantageous. In some cases, the course of the lane center is required for the control of the vehicle. Ambient measured data pertaining to the at least one camera, for instance, describe the course of roadway boundaries or roadway markings that are located at the side of the roadway. At the time of the data fusion of these ambient measured data, the course of the roadway markings or roadway boundaries can therefore be estimated.

In the case where the width of the roadway is known, by reference to this estimate the state function that describes the course of the lane center can be ascertained. By translation and amendment of curvature values, the state function that describes the course of the lane center can be inferred from the course of the roadway markings and roadway boundaries.

Optionally, in further embodiments the computer-implemented method may further include a provision of measured validation data and a validation of the estimate of the course of a roadway with the aid of the validation data. Further sensors—such as, for example, lidar sensors, radar sensors and/or ultrasonic sensors—can provide the measured validation data that characterize a position and/or a course of peripheral developments of the roadway, for instance by reference to spatial coordinates. Peripheral developments may be, for instance, guard rails, noise barriers or delineator posts.

Hence the measured validation data characterize negotiable zones for the vehicle. When validating the estimate of the course of a roadway, it can be ascertained whether the state function lies within the negotiable zone, and hence a statement can be made as to whether the estimated course of a roadway may be realistic. The validation enhances the robustness of the computer-implemented method in relation to errors in the estimation of the course of a roadway. For example, a faulty estimate—that is to say, a state function that does not lie within the negotiable zone—can be disregarded in connection with the control of the vehicle. A second aspect disclosed herein relates to a device for estimating the course of a roadway in the vicinity of the vehicle. The device includes one or more interfaces, in order to capture ambient measured data. Furthermore, the device includes a processing unit which has been designed to execute the computer-implemented method for estimating the course of a roadway in the vicinity of the vehicle.

The ambient measured data may be, for instance, map data or ambient measured data pertaining to the camera. An interface of the device is accordingly, for instance, a connection to a storage medium on which the map data have been stored and from which they can be retrieved or communicated. Further interfaces could be connections to one or more cameras that provide the ambient measured data.

The processing unit may be, for instance, a computer, a microcontroller, a processor or a programmable hardware component that has been configured to execute the computer-implemented method. The ambient measured data captured by the interfaces are communicated from the interfaces to the processing unit, so that the ambient measured data serve as input variable for estimating the course of a roadway.

A third aspect relates to a vehicle with the device for estimating the course of a roadway in the vicinity of the vehicle. The vehicle may be any ground-based vehicle, in particular a passenger car, truck, motorcycle or agricultural machine.

BRIEF DESCRIPTION OF THE DRAWINGS

Embodiments will be elucidated in more detail below with reference to the accompanying figures. Shown are:

FIG. 3 a schematic flowchart of the computer-implemented method for estimating the course of a roadway in the vicinity of the vehicle.

FIG. 4 a flowchart of a multi-sensor data fusion.

DETAILED DESCRIPTION

Various embodiments will now be described more fully with reference to the accompanying drawings in which a few embodiments have been represented. In the figures, the thickness dimensions of lines, layers and/or regions may have been represented in exaggerated manner for the sake of clarity.

In the field of concepts for autonomous driving, it can be of great significance for the control of vehicles driving autonomously, for instance, to estimate the environment and the course of a roadway. For instance, the vehicle can be controlled in such a manner that it regulates steering, acceleration, speed and other vehicle parameters or driving parameters autonomously, without involvement of a driver, in such a way that, for instance, the vehicle follows the estimated course of a roadway safely and/or can avoid obstacles.

Figure 1:
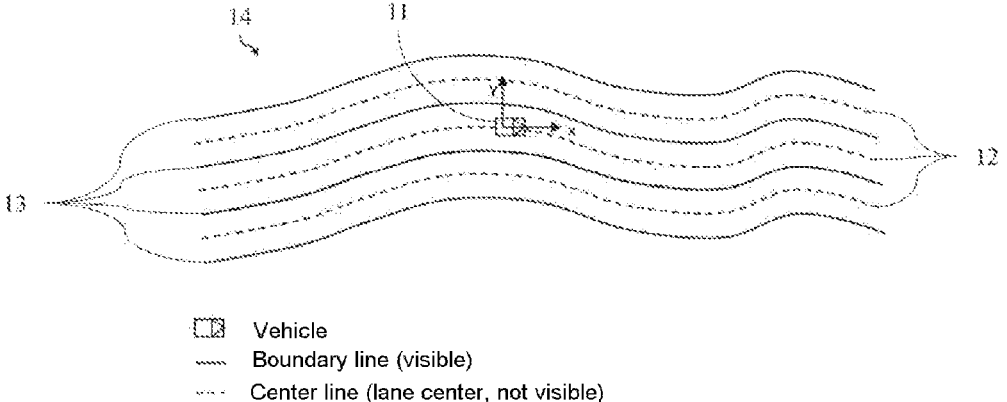
FIG. 1 a schematic representation of a multi-lane highway with a vehicle located thereon.

In FIG. 1 a schematic roadway course is shown, by way of example, of the roadway 14 on which the vehicle 11 is located and/or moving. Embodiments described herein may have been designed to estimate the course of the roadway in two translatory directions—that is to say, in two dimensions. FIG. 1 shows the roadway from a plan view in the two dimensions. The vehicle 11 is located in the middle one of three lanes of the roadway 14, which, for example, are permitted to be driven along in one or both directions. In some advantageous embodiments described herein, a course of the roadway 14 or of the lane, for instance, can be estimated. In a broader sense, by the "course of the roadway" in the present disclosure both the course of the roadway and the course of the lane may be meant.

A center of the lane and/or a course of the center of the lane may have been denoted by a center line 12. Usually, however, highways do not have a center line 12, so the lane center is not "visible". The individual lanes are typically each delimited by roadway markings such as a boundary line 13.

Usual methods from the prior art determine the course of a roadway, for instance, by reference to a roadway model based on polynomials or polynomial splines that may result directly, for instance, from photographs taken by the camera or from the digital map.

In the course of construction planning, however, by reason of ride comfort and for safety reasons the roadway 14 is typically designed in accordance with a spline (clothoid spline) of contiguous clothoid segments. One advantage of such a design of the roadway 14 is a linear change in a curvature of the roadway, so that curves can be driven through with a high degree of ride comfort and, for the driver of vehicles traveling non-autonomously, can be assessed well. By reason of a style of construction based on the clothoid spline, it may prove advantageous to assume a roadway model based on a clothoid spline when estimating the course of a roadway. For example, the accuracy and reliability of the estimation can consequently be enhanced.

Figure 2:
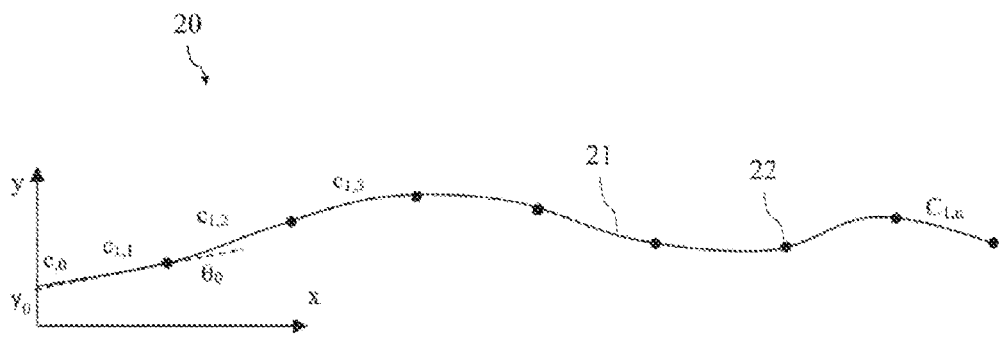
FIG. 2 an example of a clothoid spline with n clothoid segments.

The roadway model of the roadway 14, which is based on a clothoid spline 20, is shown by way of example in FIG. 2. The clothoid spline 20 comprises the clothoid segments 21 and the transition-points 22 between two clothoid segments 21. The clothoid segments 21 correspond to parts of clothoid functions.

The clothoid functions, or curvature values c(s) of the clothoid functions, can be mapped as a function of the arc length s in accordance with:

$$c(s) = c_0 + c_{1,m} * s \qquad (1)$$

Here, $c_0$ stands for an initial curvature and $c_{1,m}$ stands for a constant change in curvature of the mth clothoid segment 41 with arc length s. By reference to (1) it can be seen that the curvature value c(s) of the clothoid function changes linearly with $c_{1,m}$.

In the case of the clothoid spline 20 represented in FIG. 2, an orientation $\theta_0$ and a y-axis intercept $y_0$ of a clothoid segment 21 can additionally be specified. In general, each of the clothoid segments 21 of the clothoid spline 20 can accordingly be completely characterized by the parameters $c_0$, $c_1$, $\theta_0$ and $y_0$. For the clothoid spline 20 with n (n$\in \mathbb{N}$) clothoid segments 21, this would mean that the clothoid spline 20 can be described by 4*n parameters.

The clothoid spline 20 shown in FIG. 2 satisfies connection conditions between the clothoid segments 21 that can reduce a number of parameters necessary for describing the clothoid spline 20, so that a computational effort for determining the clothoid spline 20 is reduced. The clothoid spline 20 is, for instance, continuous, differentiable at the transition-points 22, and the curvature values of two consecutive clothoid segments 21 are equivalent at the transition-points 22. Under the stated connection conditions, the number of parameters necessary for describing the clothoid spline 20 can be reduced to n+3. The clothoid spline 20 can therefore be completely characterized by a reduced parameter set (c.

The clothoid spline 20 is able to map the course of the roadway 14, for instance both in front of and behind the vehicle 11, to a good approximation. For a determination of the clothoid spline 20, ambient measured data pertaining to several—where appropriate, diverse—data sources or sensors are drawn upon. Particularly in the case where use is made of different types of sensor, there may be a need to determine the clothoid spline 20 in such a manner that the ambient measured data pertaining to the diverse sensors also enter into the determination of the clothoid spline 20. This need can be met, for instance, by embodiments of the computer-implemented method 30 represented in FIG. 3 for estimating the course of a roadway.

The computer-implemented method 30 for estimating the course of a roadway in the vicinity of the vehicle is based on a determination of the state function describing the course of the roadway. The state function encompasses the clothoid spline 20.

The computer-implemented method 30 includes the provision 31 of ambient measured data that describe the course of the roadway at a current position of the vehicle 11. The ambient measured data include the at least one polynomial function. The computer-implemented method 30 includes, moreover, the transforming 32 of the state function and of the ambient measured data into the common coordinate system and the adapting 33 of the state function on the basis of the ambient measured data in the common coordinate system.

The ambient measured data pertaining to the vehicle's own sensorics, such as the camera or several cameras, are able to describe, as in a present embodiment, a course of the boundary lines 13 or the course of the lane center 12 of the roadway by reference to a polynomial function or a polynomial spline.

The HD map provided by a map manufacturer can, in addition, be drawn upon for the purpose of estimating the course of a roadway. On the basis of waypoints of the roadway, which can be taken from the HD map, ambient measured data can be ascertained. The waypoints may denote, for instance, the center of the lane. The map data resulting from this usually describe the course of the roadway by reference to a further polynomial spline.

Real-time filters, such as a Kalman filter, it may, for instance, be possible to update the state function, or, to be more exact, the clothoid spline 20, with the ambient measured data, provided that the state function and the ambient measured data are located in the common coordinate system. For instance, the state function is present, as in representation (1), in a state space that encompasses curvature values. The ambient measured data are present, for instance, in a measurement space with spatial coordinates. The state function can be mapped by transforming 32, for instance in the common coordinate system that may encompass curvature values or spatial coordinates.

In the common coordinate system the Kalman filter can, for instance, draw upon the ambient measured data in order to perform an adapting 33 of the clothoid spline 20 to the ambient measured data.

The computer-implemented method 30 can, for instance, describe an individual recursion step of the recursive method. The recursive method comprises, for instance, several consecutive recursion steps which each serve for estimating the course of a roadway. The recursive method can be realized, for instance, by the Kalman filter or by other real-time filters. In some embodiments, the Kalman filter has proved advantageous.

Input variables of the individual recursion steps are the state function from one of the preceding recursion steps and the ambient measured data that can be captured by the provision 31 of the ambient measured data by means of the at least one camera and the HD map.

A capturing and the transforming 32 of the state function of a preceding recursion step characterize a first phase of the Kalman filter. This phase is designated as prediction.

At the time of the prediction carried out by the Kalman filter, an estimate for a current state of the clothoid spline 20 can be ascertained. For this purpose, the clothoid spline can be subjected to state dynamics. The state dynamics are determined, for instance, by a motion of the vehicle 11. For instance, if the vehicle 11 is moving along the roadway 14 the clothoid spline 20 can be extended in front of the vehicle 11 and shortened behind the vehicle 11.

Since the clothoid spline 20 is usually composed of individual segments 21, the clothoid spline 20 cannot, for instance, be continuously extended or shortened in each recursion step but only in the case where the vehicle 11 is traveling over one of the transition-points 22.

In each recursion step, a check can additionally take place 33a as to whether there is an error in the underlying ambient data. The check can be made by a deviation between a value of the state function ascertained in a prediction step of a Kalman filter and the current ambient data being ascertained and by this deviation being compared with a predetermined threshold value. If the ascertained deviation is greater than a predetermined (upper) threshold value or less than a predetermined (lower) threshold value, there is an error. This error can subsequently be stored 33b and not used any further for the state function—that is to say, not in a phase designated as innovation. The storing may also include a marking of a faulty lane marking corresponding to the error. Furthermore, the error and corresponding data, such as the marked faulty lane marking, can subsequently be sent to a receiving unit arranged outside the vehicle. Depending upon the error, the transmitted data can easily be utilized, for instance for a highways authority for the purpose of correcting the faulty lane marking on a highway and/or to for a vehicle manufacturer for the purpose of improving a camera/lidar lane-marking detection function, in particular for a manual labeling for the purpose of improving learning algorithms. Furthermore, the transmitted data can be utilized to decide whether an autonomous driving mode is to be deactivated at this faulty lane marking. Consequently these data can be utilized to enhance the reliability and safety of autonomous driving functions. Furthermore, the sent data can be checked, in order to detect whether the error has arisen by reason of faulty data pertaining to a camera or by reason of faulty data pertaining to a digital map.

If there is no error, the following described process takes place.

The state function of the preceding recursion step is updated by adapting 33 to the ambient measured data in each recursion step. The adapting 33 corresponds to a second phase of the Kalman filter, designated as innovation. For the adapting 33, the state function is compared, for instance, with the ambient measured data. For instance, for this purpose individual values of the state function are compared with other values of the ambient measured data. Depending upon the measurement space, these values may be, for instance, spatial coordinates or curvature values of the state function and of the ambient measured data. Usually, the values of the state function have a fuzziness or, to be more exact, the values of the ambient measured data have a measurement uncertainty, which in each instance can be represented by a probability distribution such as, for example, a Gaussian distribution. In the second phase of the Kalman filter, the adapting 33 of the state function can be undertaken with the state function and with the ambient measured data as input variables. A weighting of the input variables at the time of the adapting 33 of the state function may be dependent on the measurement uncertainties, or on the fuzziness. The lower the measurement uncertainty of the ambient measured data, the more intensely can, for instance, the state function ascertained at the time of the prediction be approximated to the ambient measured data. The greater the measurement uncertainty of the ambient measured data 14, the lower the weighting of the ambient measured data can be at the time of the adapting 33. The fuzziness of the state function that is present as input variable is based, for instance, on mean values and specifications relating to the scatter (for example, covariances) of the parameters of the clothoid spline 20. The mean values and covariances can be ascertained from the parameters of preceding recursion steps. The fuzziness of the state function may have been determined, for instance, by the covariances. In the case of high covariance, the state function acquired at the time of the prediction may have been given a low weighting.

In contrast, in the case of a low covariance the state function is weighted heavily. Accordingly, depending upon fuzziness and measurement uncertainty, an updated state function or clothoid spline 20 results from the ambient measured data and from the state function serving as input variable. In a subsequent recursion step, the last-updated state function can be drawn upon once again for the prediction.

The ambient data pertaining to individual sensors (sensorics provided by the map manufacturer, and the vehicle's own sensorics) cannot determine the course of a roadway exactly. The ambient measured data pertaining to the sensorics may, for example, be noisy or faulty in some cases. The data fusion of the ambient data pertaining to several different types of sensor (data sources), on the other hand, can guarantee a robust, highly available estimation, largely unaffected by error, of the course of a roadway. This concept of multi-sensor data fusion is illustrated in FIG. 3.

At the time of the multi-sensor data fusion, data—in particular, ambient measured data—pertaining to a plurality of sensors can be merged to form the roadway model. In the embodiment represented in FIG. 4, the ambient measured data can be provided by means of the camera 41 and the HD map 43.

The camera 41 may, for instance, have been attached to the vehicle and directed in the direction of travel. As already mentioned, from the photographs taken by the camera 41 the roadway markings, the roadway boundaries and the course thereof can be represented approximately in the form of one or more consecutive polynomial functions by means of an image-processing application. Typically, a range or a measurement radius of the camera 41 is limited by obstacles or by an optical range of the camera 41.

The HD map 43 is typically based on output variables pertaining to sensorics provided by a map manufacturer 42. By interpolation of the waypoints that can be taken from the HD map, one or more connected polynomial functions can be determined, in order to describe the course of a roadway by approximation. The HD map 43 or corresponding map data may be present, for instance, on a storage medium which has been fitted to the vehicle 11.

Alternatively or additionally, the HD map 43 or the map data could be communicated from a transmitter to a receiving module of the vehicle 11 or of a device for estimating the course of a roadway.

By adapting 33 of the state function in the second phase of the Kalman filter, the ambient measured data pertaining to the HD map 43 and to the camera 41 enter into—for instance, in accordance with the multi-sensor data fusion 40—the estimating of the course of the roadway or of the roadway model 45 which may be represented by the state function or by the clothoid spline 20. Even though the embodiment described herein makes provision for a use of a single camera, further embodiments may include a plurality of cameras 41 which, where appropriate, may have been oriented in various directions.

Figure 5:
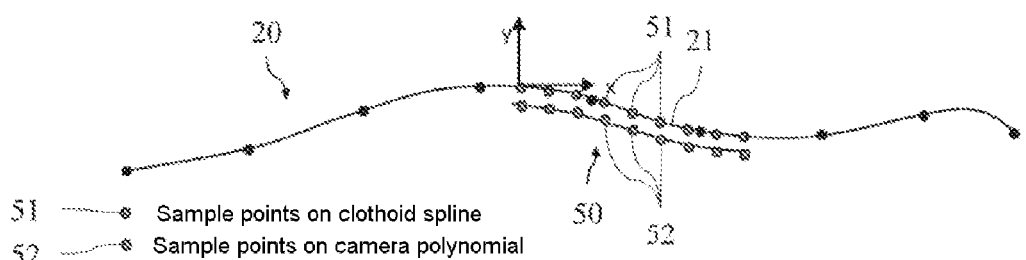
FIG. 5 a schematic representation of a method for sampling the clothoid spline and the ambient measured data.

With the Kalman filter, the clothoid spline 20 can, for instance amongst other things, be adapted to ambient data pertaining to the camera 41. In the following, the data fusion 44 of the ambient measured data pertaining to the camera 41 will be considered in more detail with the aid of the curves 20 and 50 represented in FIG. 5.

For the adapting 33 of the state function 20 in the second phase of the Kalman filter, the state function 20—that is to say, the clothoid spline 20—and the ambient measured data 50 are transformed into a point space. This means that both the ambient measured data 50 and the clothoid spline 20 can each be described by a plurality of points in the point space. The points can be ascertained from the clothoid spline 20 and the ambient measured data 50 by a sampling method. Therefore the points are also called sample points 51 and 52.

It is not possible to ascertain sample points 51 or spatial coordinates of sample points 51 by reference to the usual representation (1) for the clothoid spline 20. Therefore the transforming 32 of the clothoid spline 20 is necessary. For the transforming 32 of the clothoid spline 20, a measurement model can be ascertained, with the aid of which the clothoid spline 20 can be transformed into the measurement space of the ambient measured data 50, so that the clothoid spline 20 can be represented by spatial coordinates.

There are several measurement models for transforming 32 the clothoid spline 20 in order to represent the latter by spatial coordinates instead of by arc lengths and curvature values as in (1). In the following, two measurement models that can be drawn upon for the purpose of transforming 32 the clothoid spline 20 will be considered, by way of example, by reference to the illustrations 60-1 and 60-2 represented in FIG. 6.

A first measurement model for the transforming 32 of the clothoid spline 20 makes provision for an approximate representation of the clothoid spline 20, by the clothoid segments 21 being approximated by third-degree polynomials 62. This representation is shown in illustration 60-1. The third-degree polynomial 62 can be represented as follows:

$$y(x) = ax^3 + bx^2 + cx + d \qquad (2)$$

a, b, c, and d correspond to parameters that determine a shape of polynomial 62. For the approximate representation of the clothoid segment 21, parameters a, b, c, and d can be replaced by parameters $c_0$, $c_{1,m}$, $\theta_0$ and $y_0$ of the clothoid segment 21 in the following way:

$$a = c_{1,m}, b = c_0, c = \mathrm{atan}(\theta_0), d = y_0 \qquad (3)$$

By insertion of the parameters according to (3), polynomial 62, for instance, is obtained which maps by approximation a course of the clothoid or, for instance, of the clothoid segment 21.

Sample points 61 consequently correspond approximately to sample points 51. By virtue of the approximate representation of the clothoid segment 21 by (2) and (3), spatial coordinates can therefore be assigned to each sample point 61. The clothoid spline 20 in the Kalman filter can be represented in the point space with the aid of the first measurement model described herein. With sample points 61 and sample points 52 of the point space as input variables, the Kalman filter can perform an approximation of polynomial 62 to the ambient measured data 50. In this connection, values for the parameters $c_0$, $\theta_0$, $y_0$, and $c_{1,1}$ . . . $c_{1,n}$ of the clothoid spline 20 can be ascertained. With the aid of insertion of the values, the estimate of the course of a roadway can be determined that results from the adapting 33 of the clothoid spline 20 to the ambient measured data 50 pertaining to the camera 41.

In the case of slight curvatures, the clothoid segments 21 can be approximated well by the described measurement model according to (2) and (3). In the case of intense curvatures, an accuracy of the approximate representation of the clothoid spline 20 according to (2) and (3) may be insufficient to guarantee a high degree of accuracy for the adapting 33 of the clothoid spline 20 to the ambient measured data 50.

For a better approximation in the case of intense curvatures, a second measurement model instead of the first measurement model can be applied to the clothoid spline 20. For instance, the clothoid segment 21 can be represented by the parameter representation of the clothoid function.

Figure 6:
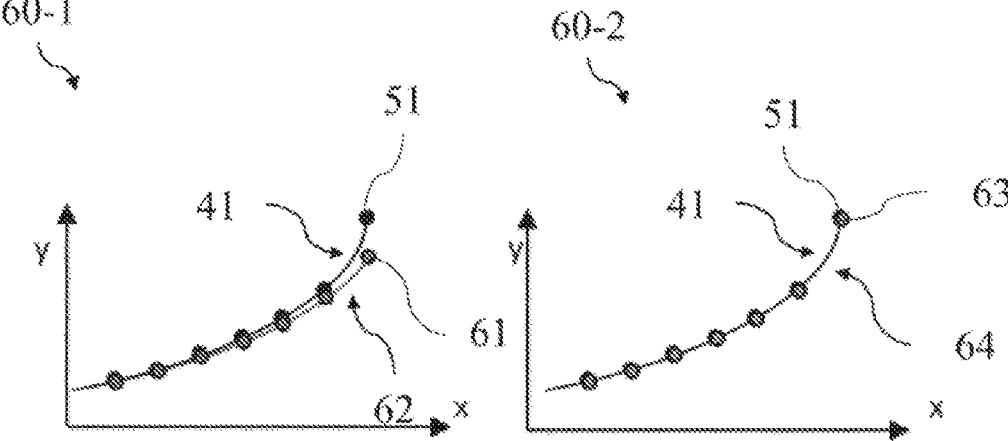
FIG. 6 a graphical comparison of two approximation methods for approximating the clothoid spline.

This is illustrated in illustration 60-2. In the case of the parameter representation—for instance, of the clothoid segment 21—each sample point 63 is represented in a vector representation. A vector of such a sample point 63 comprises, for instance, two components that can be expressed by Fresnel integrals. In order to reduce a numerical effort for computation of the Fresnel integrals, a fifth-order Taylor expansion of the Fresnel integrals, for instance, can be used instead of the Fresnel integrals. From this approximation of the clothoid segment 21, a function 64, for instance, may result, the function 64 corresponding to a Taylor polynomial 64 by reason of the fifth-order Taylor expansion. As can be seen in FIG. 6, this polynomial 64 describes the course of the clothoid segment 21 relatively accurately. The sample points 63 determined with the aid of the second measurement model describe the clothoid segment 21 and/or the clothoid spline 20 to a good approximation, even in the case of intense curvatures. The sample points 63 generated by the second measurement model can better represent the clothoid spline by approximation, particularly in the case of large curvatures, than the sample points 61 generated by the first measurement model. Therefore the course of a roadway can usually be determined with greater accuracy with the aid of the second measurement model than with the first measurement model. In general, both measurement models can be employed for estimating the course of a roadway.

Figure 7:
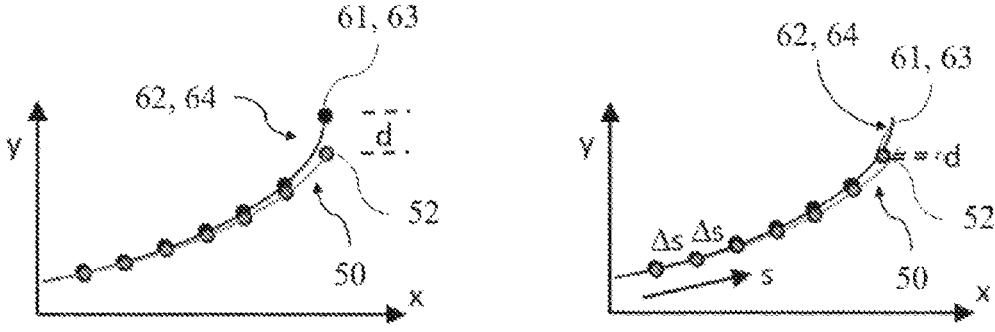
FIG. 7 a graphical comparison of two sampling methods.

Varying sampling methods can be used for a determination of sample points 61 and 63 of the respective measurement models and of sample points 52 of the ambient measured data 50. Two possibilities for the sampling method are illustrated in FIG. 7. In a first, usual sampling method (on the left in FIG. 7), sample points 61, 63 and 52 can be chosen in such a way that a spacing of the sample points in the x-direction is constant. It has become evident that this sampling method is not optimal for an intensely curved course of a roadway when adapting 33 the clothoid spline 20, or, to be more exact, the polynomials 62 and 64, with the Kalman filter. With this sampling method, by reason of systematic errors based on geometrical conditions in the case of intense curvatures of the course of a roadway, the distances between sample points 61 or 63 and sample points 52 can be relatively large, even though the polynomial 62 or 64 corresponds approximately to the ambient measured data 50. The Kalman filter would then shift the clothoid spline 20 "too intensely" at the time of the innovation. For instance, in an example represented in the diagram on the left in FIG. 7, the clothoid spline 20 would be shifted down too much, since the spacing d of sample points 61 or 63 from sample points 52 is relatively large.

Such a systematic error can be reduced by choosing a second sampling method (on the right in FIG. 7) along the lines of further embodiments. In the case of the sampling method illustrated in the diagram on the right in FIG. 7, sample points 61, 63 and 52 are chosen in such a way that a constant arc length Δs lies between adjacent sample points 61, 63 and 52 of the respective polynomials 62, 64 or of the ambient measured data 50. In this way, even in the case of intense curvatures of the course of a roadway, sample points 61, 63 and 52 are situated in such a way that the spacing d between sample points 61 or 63 and sample points 52 is, as a result, for instance, smaller than in the diagram on the left in FIG. 7. Correspondingly, the clothoid spline 20 is, for instance, shifted downward less intensely by the Kalman filter. The adapting 33 of the clothoid spline 20 with the Kalman filter by using the second sampling method can achieve a higher accuracy in comparison with the adapting 33 by using the first sampling method. In addition, the second sampling method has a stabilizing effect on a function of the Kalman filter and hence also has a stabilizing effect on a lateral guidance behavior in the course of controlling the vehicle, since the clothoid spline 20 is corrected slightly by using the second sampling method in the course of the adapting 33. Hence it may be the case that the state function is adapted less "intensely" in the individual recursion steps and is therefore designated as "more stable".

Figure 8:
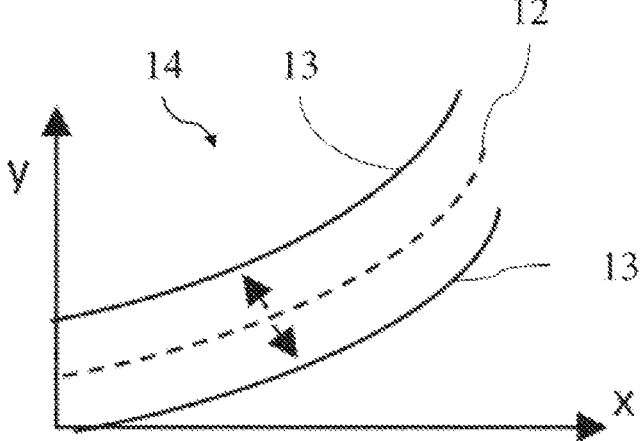
FIG. 8 a schematic illustration of a roadway marked by roadway markings.

In some embodiments, the camera 41 can capture the course of roadway markings 12 or 13, and the image-processing application may have been designed to detect such roadway markings 12 or 13 and to describe them approximately by a polynomial or a polynomial spline. Roadway markings 13 denote boundaries of the roadway. Roadway marking 12 denotes the center line of the roadway, which in some cases is not visible. A schematic illustration of a roadway denoted by roadway markings 12 and 13 is illustrated in FIG. 8. By reference to the course of the roadway markings and/or 13, a roadway width or lane width can, for instance, be ascertained from photographs taken by the camera 41 with the aid of the suitable image-processing application. In some cases, the estimate of the course of the roadway may correspond to the course of roadway markings 13. This may be advantageous for the control of the vehicle. From the courses of two roadway markings 13 which delimit the lane to the right and to the left, it is possible, for instance, to ascertain the lane width or to derive the course of the center line 12 therefrom.

In the course of the control of the vehicle it may be necessary, under certain circumstances, to ascertain the course of the lane center. In the absence of a center line 12, a course of the lane center cannot be ascertained directly by data fusion 44 of the ambient measured data 50 pertaining to the camera. In such a case, the course of the roadway markings or roadway boundaries 13 can be ascertained by means of data fusion 44, and, proceeding therefrom, taking the lane width into consideration, the course of the lane center or of the center line 12 can be derived. The lane width of the roadway to be determined can either be taken from a data record available to the vehicle or can be determined by reference to the course of roadway markings 13. For a determination of the course of the center line 12, the clothoid spline 20 that, for instance, describes the course of the middle of the lane can be transformed in such a way that a transformed clothoid spline describes the course of one of the roadway markings 13, in order to enable an adapting 33 of the clothoid spline 20 to the ambient measured data pertaining to the camera. After adapting 33 of the clothoid spline 20, the clothoid spline that, in turn, characterizes the course of the lane center can be determined by inverse transforming. For geometrical reasons, for the transforming and inverse transforming it may not be sufficient to shift the clothoid spline 20 in translatory manner—that is to say, in the x- and y-directions.

For this purpose it may, for instance, be necessary to adapt the parameters $c_0$, $c_{1,m}$ in addition by means of a mathematical method in such a way that the transformed clothoid spline corresponds to the course of the center line 12 and hence runs parallel to the roadway boundaries 13.

Figure 9:
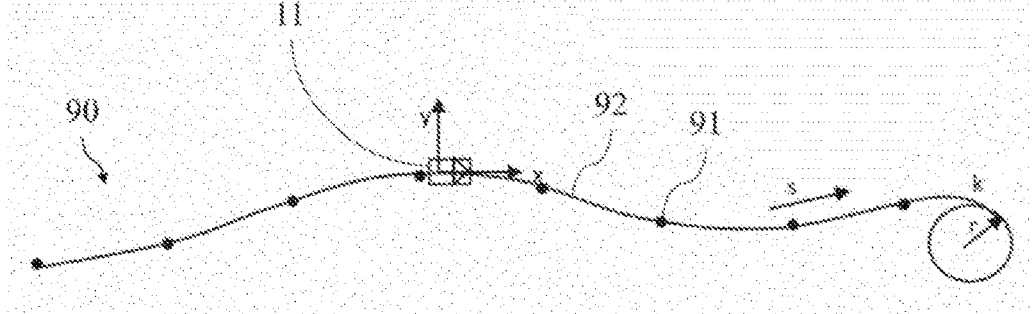
FIG. 9 a representation of the map data and the vehicle located on the roadway.

Alternatively, for the adapting 33 of the clothoid spline 20 the ambient measured data pertaining to the camera can be transformed, taking a lane width into consideration, in such a way that they approximately characterize the course of the center of the roadway. The Kalman filter can then perform an adapting 33 of the clothoid spline 20 to the transformed measured data. For the multi-sensor data fusion illustrated schematically in FIG. 4, ambient measured data pertaining to a further data source, different from the camera, are usually drawn upon. In the embodiment shown in FIG. 4, the map data pertaining to the HD map 43 are used for this purpose. An example of such map data is shown in FIG. 9. The sensorics provided by the map manufacturer 42 yield waypoints 91 that are situated on the roadway of the vehicle 11. The waypoints can be connected by interpolation, taking further connection conditions into consideration. At the time of the interpolation, the waypoints can be connected by polynomials 92, for instance. In this way, a polynomial spline 90 can be generated from several polynomial functions 92. The polynomial spline 90 may, for instance, correspond to the map data.

In some embodiments described herein, the polynomial spline may have been represented as a function in spatial coordinates. The clothoid spline 20, which at the time of the data fusion 44 can be adapted to the polynomial spline 90 by the Kalman filter, is usually present, here too, as a parameter set of the parameters $y_0$, $\theta_0$, $c_0$ and $c_{1,1} \dots c_{1,n}$ which are able to map the clothoid spline 20 with the aid of the curvature values $c(s)$ resulting from (1).

In comparison with the ambient measured data 50 pertaining to the camera 41, the map data can already be ascertained long before the camera 41 is able to capture the roadway. For instance, the course of the roadway 14 after intensely curved and/or non-observable curves can be estimated. The map data can, for instance, be used in order to determine well the course of the roadway far ahead of the vehicle 11 by approximation.

An orientation of the vehicle sometimes cannot be ascertained, or cannot be ascertained accurately, by reference to the map data. The orientation of the vehicle with respect to the roadway 14 typically cannot be determined from position data pertaining to the vehicle 11 and from the polynomial spline 90, since no indication of the orientation of the vehicle 11 can result therefrom. Usually, therefore, spatial coordinates of the map data are not drawn upon in the Kalman filter in order to adapt the clothoid spline 20 to the map data. In this connection, a further measurement model may be employed, in which the map data are represented in a measurement space that encompasses a coordinate system with curvature values.

For the aforementioned data fusion 44 in the measurement space with the coordinate system with curvature values, it is, for instance, advantageous to represent the clothoid spline 20 in accordance with (1). Consequently the state space of the clothoid spline 20 may already correspond to the measurement space.

The polynomial spline 90 provided by the HD map 43 is usually present as a mapping in a coordinate system with spatial coordinates. In advantageous practical forms disclosed herein, transforming 32 the map data into the measurement space with the coordinate system with curvature values may therefore be necessary. A suitable mapping of the map data may be, for instance, a function of the arc length s of the map data, in which case a curvature value k of the map data results as a function of the arc length s.

For the adapting 33 of the clothoid spline 20 to the polynomial spline 90, the curvature values of the clothoid spline 20 are approximated to the curvature values k of the polynomial spline 90, for instance at the time of the innovation carried out by the Kalman filter. For instance, for this purpose the curvature values k at the waypoints of the map data are taken into consideration. The adapting 33 can be undertaken by adapting the parameters $y_0$, $\theta_0$, $c_0$ and $c_{1,1} \ldots c_{1,n}$.

One advantage of the described data fusion 44 by reference to the curvature values k is that this data fusion 44 is robust in relation to angle errors and offset errors. On the assumption that a localization ascertains a lane in which the vehicle 11 is actually located, the course of the roadway can, for instance, be estimated accurately by reference to the curvature values k, even if the vehicle 11 is not located precisely in the center of the lane or is not aligned parallel to the center line 12.

In advantageous versions herein, the computer-implemented method may include the multi-sensor data fusion 40. Advantages may result from the multi-sensor data fusion 40 of ambient measured data 50 and map data.

At the time of the data fusion 44 of the ambient measured data, the position and orientation of the vehicle 11 with respect to the roadway 14 can, for instance, be ascertained. In the course of the control of the vehicle 11, a straying of the vehicle 11 from the roadway 14, for instance, can consequently be prevented.

With the aid of the data fusion 44 of the map data, the course of the roadway can be determined far in advance, so that the control of the vehicle 11 can, for instance, reduce a speed of the vehicle early enough in order to drive safely through an intensely curved curve that cannot be observed.

Figure 10:
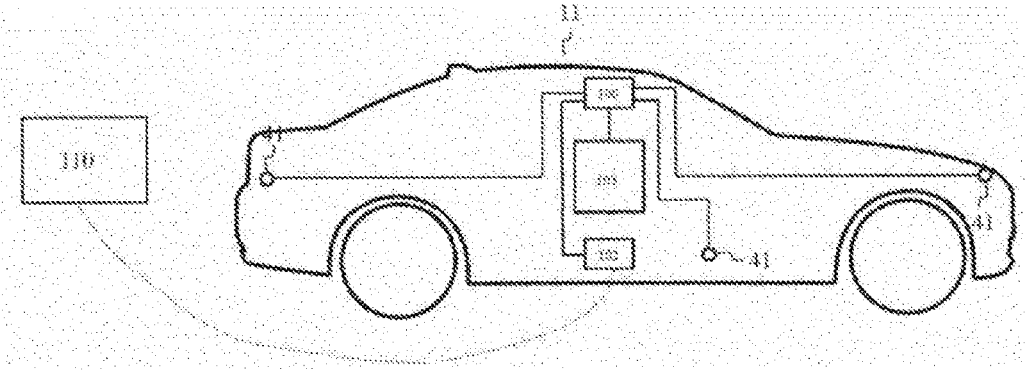
FIG. 10 a schematic illustration of the vehicle with a device for estimating the course of a roadway.

Moreover, the data fusion 44 offers robustness in relation to angle errors and offset errors in the estimation of the course of a roadway, as a result of which errors of measurement of the estimation can be reduced. The computer-implemented method 30 can be used for the control of any ground-based vehicles 11. An example of such a vehicle 11 is shown in FIG. 10. The vehicle 11 may have been equipped with a device 100 that serves for estimating the course of a roadway. The device 100 comprises a processing unit (not shown here) and several interfaces for capturing ambient measured data. One such interface may be, for instance, a connection of the processing unit to one or more cameras 41. The cameras 41 may, for example, have been oriented in the direction of travel, contrary to a direction of travel, or to the side, and may enable a provision 31 of the ambient measured data 50. Further interfaces may connect the processing unit to a storage medium 103 such as, for example, a hard-disk drive or an optical memory and, additionally or alternatively, to a receiving unit 102. The provision 31 of map data 90 can be made possible by the map data 90 being present on the storage medium 103 or being capable of being received by the receiving unit 102 and provided to the processing unit. For instance, the map data can be transmitted to the receiving unit from a transmitter 110. With the ambient measured data 50 and the map data, the device 100 can determine an estimate of the course of a roadway by executing the computer-implemented method 10.

For this purpose, the processing unit has been designed to execute the transforming 32 of the clothoid spline 20 and of the ambient measured data 50 and/or of the map data. Moreover, the processing unit has been configured for the adapting 33 of the clothoid spline 20 to the ambient measured data. The processing unit may be, for example, a processor, a microcontroller, a field-programmable gate array (FPGA), a computer or a programmable hardware component.

The aspects and features that have been described together with one or more of the previously detailed examples and figures can also be combined with one or more of the other examples, in order to replace a like feature of the other example or in order to introduce the feature into the other example.

Examples may furthermore be, or relate to, a computer program with program code for executing one or more of the above methods when the computer program is executed on a computer or processor. Steps, operations or processes of various methods described above can be executed by programmed computers or processors. Examples may also cover program-storage devices, for example digital data-storage media that are machine-readable, processor-readable or computer-readable, and machine-executable, processor-executable or computer-executable programs of instructions. The instructions perform some or all of the steps of the methods described above, or bring about the execution thereof. The program-storage devices may include, or be, for example, digital memories, magnetic storage media such as, for instance, magnetic disks and magnetic tapes, hard-disk drives or optically readable digital data-storage media. Further examples may also cover computers, processors or control units that have been programmed to execute the steps of the methods described above, or (field-)programmable logic arrays ((F)PLAs) or (field-)programmable gate arrays ((F)PGAs) that have been programmed to execute the steps of the methods described above.

Only the principles of the disclosure are presented by the description and drawings. Furthermore, all the examples specified here are expressly intended to serve, in principle, for illustrative purposes only, in order to assist the reader in comprehending the principles of the disclosure and the concepts contributed by the inventor(s) for further development of the technology. All the statements made herein about principles, aspects and examples of the disclosure, as well as specific examples of the same, encompass the equivalents thereof.

A function block designated as "means for . . . " executing a particular function may relate to a circuit that has been designed to execute a particular function. Consequently a "means for something" may have been implemented as a "means designed for or suitable for something", for example a module or a circuit designed for or suitable for the respective task. Functions of various elements shown in the figures, inclusive of each function block designated as "means", "means for providing a signal", "means for generating a signal", etc. may have been implemented in the form of dedicated hardware, for example "a signal-provider", "a signal-processing unit", "a processor", "a control system" etc., and also as hardware capable of executing software in conjunction with associated software. In the case of provision by a processor, the functions may have been provided by a single dedicated processor, by a single processor used collectively, or by a plurality of individual processors, some or all of which can be used collectively.

However, the term "processor" or "control system" is by no means limited to hardware that is exclusively capable of executing software, but may encompass digital signal-processor hardware (DSP hardware), network processor, application-specific integrated circuit (ASIC), field-programmable gate array (FPGA), read-only memory (ROM) for storing software, random-access memory (RAM) and non-volatile storage. Other hardware—conventional and/or customer-specific—may also have been included.

A block diagram may represent, for example, a rough circuit diagram that implements the principles of the disclosure. Similarly, a flow diagram, a flowchart, a state-transition diagram, a pseudocode and such like may represent various processes, operations or steps which, for example, are substantially represented in computer-readable medium and accordingly executed by a computer or processor, irrespective of whether such a computer or processor has been shown explicitly. Methods disclosed in the description or in the claims can be implemented by a module that exhibits a means for executing each one of the respective steps of these methods.

It will be understood that the disclosure of several steps, processes, operations or functions disclosed in the description or in the claims is not to be construed as being in the particular sequence, unless this has been stated explicitly or implicitly elsewhere, for example for technical reasons. Therefore these are not limited to a particular sequence by the disclosure of several steps or functions, unless these steps or functions are not interchangeable for technical reasons. Furthermore, in some examples a single step, function, process or operation may include several sub-steps, sub-functions, sub-processes or sub-operations, and/or may be broken up into the same. Such sub-steps may have been included and may be part of the disclosure of this single step, unless they have been explicitly excluded.

Furthermore, the following claims have hereby been incorporated into the detailed description, where each claim may stand on its own as a separate example. Whilst each claim may stand on its own as a separate example, it should be noted that, even though a dependent claim in the claims may refer to a particular combination with one or more other claims, other examples may also include a combination of the dependent claim with the subject-matter of any other dependent or independent claim. Such combinations are proposed here explicitly, unless it has been stated that a particular combination is not intended.

Furthermore, features of one claim are also intended to have been included for any other independent claim, even if this claim has not been made directly dependent on the independent claim.

LIST OF REFERENCE SYMBOLS 11 vehicle
12 center line
13 roadway boundary
14 roadway
20 clothoid spline
21 clothoid segment
22 transition-point
30 computer-implemented method
31 provision of the ambient measured data
32 transforming of the state function and of the ambient measured data
33 adapting of the state function
33a checking the ambient measured data for an error
33b storing the error
33c utilizing the error
40 multi-sensor data fusion 41 camera
42 sensorics provided by the map manufacturer
43 HD map
44 data fusion
45 roadway model
50 ambient measured data pertaining to the camera
51 sample points of the clothoid spline
52 sample points of the ambient measured data pertaining to the camera
60-1 illustration of the first sampling method
60-2 illustration of the second sampling method
61 sample point of the polynomial
62 polynomial
63 sample point of the Taylor polynomial
64 Taylor polynomial
90 polynomial spline
91 waypoint
92 polynomial function
100 device
102 receiving unit
103 storage medium
110 transmitter

The invention claimed is:

1. A method for estimating a course of a roadway in a vicinity of a vehicle on the basis of a state function describing the course of the roadway, said state function encompassing a clothoid spline, said method comprising:

providing information including at least one polynomial function describing the course of the roadway at a current position of the vehicle, said information-based at least in part on data obtained from at least one of a sensor or a digital map;

using a processing unit to perform the operations of, transforming the state function and the information including the at least one polynomial function into a common coordinate system; and checking the information including the at least one polynomial function for an error; wherein if no error is detected, adapting the state function on the basis of the information including the at least one polynomial function in the common coordinate system to generate an adapted state function, and generating an estimate of the course of the roadway at least in part based on the adapted state function, and if an error is detected, storing the error in memory;

wherein the vehicle is controlled such that the vehicle follows the estimated course of a roadway and/or avoids obstacles by regulating steering, and acceleration.

2. The method as claimed in claim 1, wherein checking the information including the at least one polynomial function for the error comprises ascertaining a deviation between a value ascertained in a prediction step of a Kalman filter and the information including the at least one polynomial function, and subsequently comparing the deviation with a predetermined threshold value.

3. The method as claimed in claim 2 wherein the processing unit is supported on the vehicle, and the method further comprises sending the stored error to a receiving unit arranged outside the vehicle.

4. The method as claimed in claim 3, further comprising using the stored error for at least one of the group consisting of: correcting a roadway marking as represented in the information including the at least one polynomial function; correcting map data; improving a lane-marking recognition function; and improving an autonomous driving function.

5. A method as claimed in claim 1, wherein the processing unit is supported on the vehicle, and the method further comprises sending the stored error to a receiving unit arranged outside the vehicle.

6. The method as claimed in claim 1, wherein the stored error is utilized for at least one of the group consisting of: correcting a roadway marking represented in the information including the at least one polynomial function; correcting map data; improving a lane-marking recognition function; and improving an autonomous driving function.

7. A method as claimed in claim 1, further comprising capturing data with at least one camera supported on the vehicle, wherein the processing unit is supported on the vehicle, and wherein the information including the at least one polynomial function is based at least in part on data captured by at least one camera.

8. A method as claimed in claim 1, wherein the information including the at least one polynomial function is provided from the digital map.

9. The method as claimed in claim 1, wherein the information including the at least one polynomial function includes first ambient data and second ambient data, and wherein the first ambient data are based in part by data captured by at least one camera supported on the vehicle and the second ambient data are provided from the digital map.

10. A method as claimed in claim 1, wherein the common coordinate system includes spatial coordinates.

11. A method as claimed in claim 1, wherein adapting the state function includes determining sample points, wherein in the case of several sample points in each instance there is a constant curve length between adjacent sample points.

12. A method as claimed in claim 1, wherein the common coordinate system includes curvature values.

13. A method as claimed in claim 1, wherein adapting the state function to the information including the at least one polynomial function includes providing for adapting at least one curvature value of the state function to at least one other curvature value of the information including the at least one polynomial function.

14. A method as claimed in claim 1, wherein the state function characterizes a course of a roadway marking of a roadway.

15. A as claimed in claim 14, further including ascertaining a course of a lane center by transforming the state function.

16. A method as claimed in claim 1, further including providing measured validation data and validating the estimate of the course of the roadway based at least in part on the validation data.

17. A device for estimating a course of a roadway in the vicinity of the vehicle, comprising:

one or more interfaces which have been designed to capture the information including the at least one polynomial function;

the processing unit, wherein the processing unit is configured to execute the method as claimed in claim 1.

18. A vehicle including the device as claimed in claim 17.

19. The vehicle of claim 18, further comprising a camera, and wherein:

said information including the at least one polynomial function is based at least in part on data obtained from the camera, and wherein the processing unit is further configured to cause the stored error to be sent a receiving unit arranged outside the vehicle.

* * * * *